Figure 1:
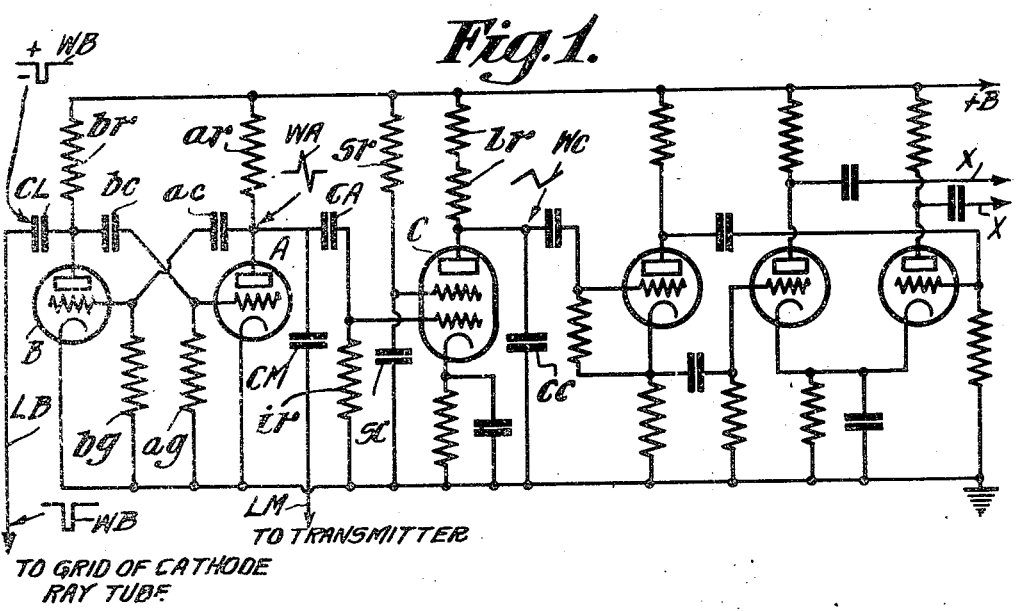

Feb. 7, 1950    R. J. KEMP ET AL    2,497,002
PULSE ECHO RANGE FINDING SYSTEM
AND IMPULSE GENERATOR THEREFOR
Filed Nov. 1, 1943
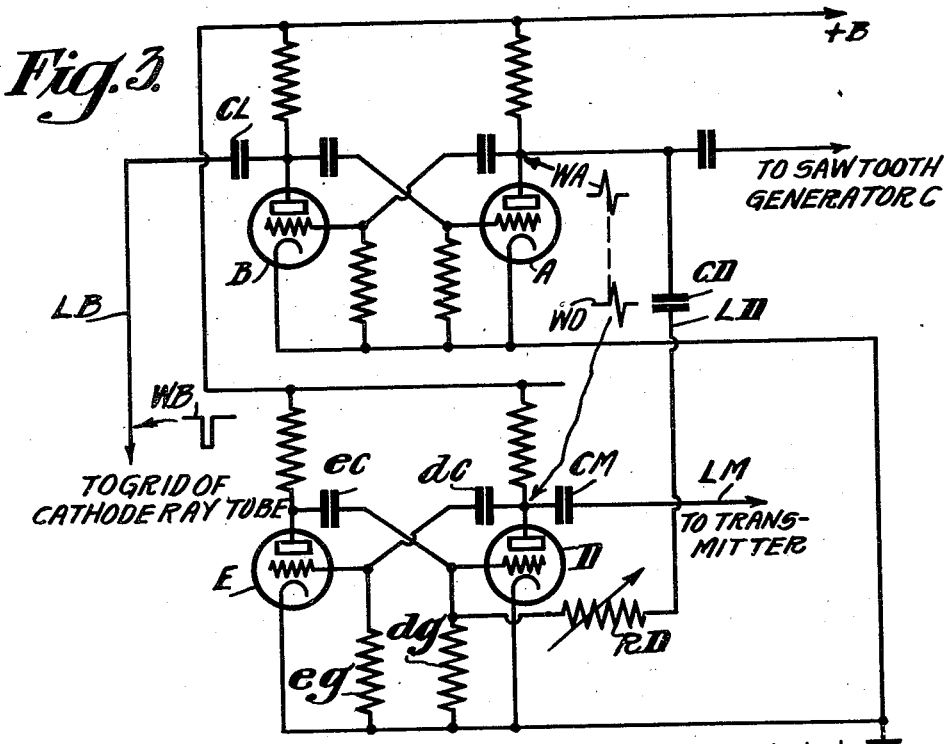
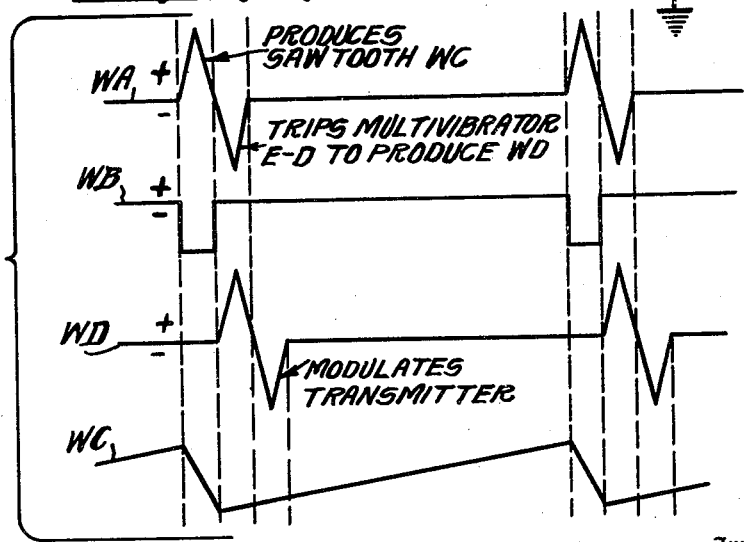
Inventors
Roland John Kemp
& David John Fewings
By
Attorney Patented Feb. 7, 1950

2,497,002

UNITED STATES PATENT OFFICE 2,497,002

PULSE ECHO RANGE FINDING SYSTEM AND IMPULSE GENERATOR THEREFOR

Roland John Kemp and David John Fewings, Chelmsford, England, assignors, by mesne assignments, to Radio Corporation of America, New York, N. Y., a corporation of Delaware Application November 1, 1943, Serial No. 508,554
In Great Britain May 19, 1941

Section 1, Public Law 690, August 8, 1946
Patent expires May 19, 1961

7 Claims. (Cl. 343—13)

The present invention relates to electric impulse generator systems and particularly, though not necessarily exclusively to electric impulse generator systems for use in range finding systems in which an electromagnetic impulse is transmitted through space to and reflected by a distant object, the reflected impulse being received on a suitable receiver and converted into a visible indication occupying a position along a time-base line, the position along the line being a measure of the distance of the distant object from the transmitter or receiver. Such systems are well known, and may include, at the receiver, a cathode ray tube provided with ray-deflecting means adapted to deflect the ray in one co-ordinate direction (usually horizontally) to provide the time-base line, and with further ray-deflecting means adapted to deflect the ray in a direction perpendicular to the time-base line to indicate the reception of the reflected impulse. The sweep of the cathode ray in the left-to-right sense in the horizontal direction, for example, should be linearly related to time and the sweep from right-to-left should be substantially instantaneous. Deflection in accordance with these requirements may, as is well known, be effected by a voltage wave, or by a current wave, of saw-tooth form. The commencement of the saw-tooth wave must coincide exactly with the instant that the impulse is transmitted and it is also preferable to indicate the transmission of the impulse on the time scale both as a general monitoring check and as an aid to the association of the reflected pulse.

Briefly, the requirements are that the impulse generator should fulfil the dual purpose of modulating the transmitter and discharging the saw-tooth wave generator both for the reasons previously stated and in order that the transmitted pulse may be "locked" to the time-base sweep.

Difficulty has been experienced in accomplishing these functions since when an impulse is used to extinguish the "flyback" sweep it cannot appear on the screen as an image of the transmitted impulse.

An object of the present invention is to provide improved methods of and means for overcoming the above-mentioned difficulties in obtaining a pulse indication.

A further object of the invention is to provide a pulse-echo system having improved means for indicating the instant of the transmission of a pulse.

A still further object of the invention is to provide an improved method of and means for obtaining a cathode ray indication of a pulse at the beginning of the time sweep of the cathode ray where the time sweep is synchronized by and with the generator of said pulse.

According to the present invention a range finder comprises a radio-transmitter and a radio-receiver, the receiver including an indicator (which may be a cathode ray tube) having time-base deflecting means and impulse responsive deflecting means, wherein there is provided an impulse generator adapted to generate an impulse having a first component followed by a second component of opposite sense to said first component, a saw-tooth wave generator, means for applying said first component to said saw-tooth wave generator whereby to control fly-back or return of the indicating member (for example cathode ray) of said indicator, and means for applying said second component to said transmitter. Preferably, the said impulse generator is adapted also to generate a second impulse in synchronism with said first component, means being provided for applying said second impulse to the cathode-ray tube so as to extinguish or blank the cathode ray during the fly-back or return line period. If desired, the said second component, instead of being applied directly to the transmitter, may be applied to a second impulse generator to control the generation of impulses thereby, said last mentioned impulses likewise having two components of opposite sense, the first component of said last-mentioned impulse coinciding in time with the second component of said first-mentioned impulse, means being provided for applying the second component of the last-mentioned impulse to the transmitter. The last-mentioned arrangement provides a desired delay between the application of the first component of the first impulse to the saw-tooth wave generator and the application of the second component of the second impulse to the transmitter to compensate, in high frequency operation, for phase delay in the system as a whole.

Figure 2:
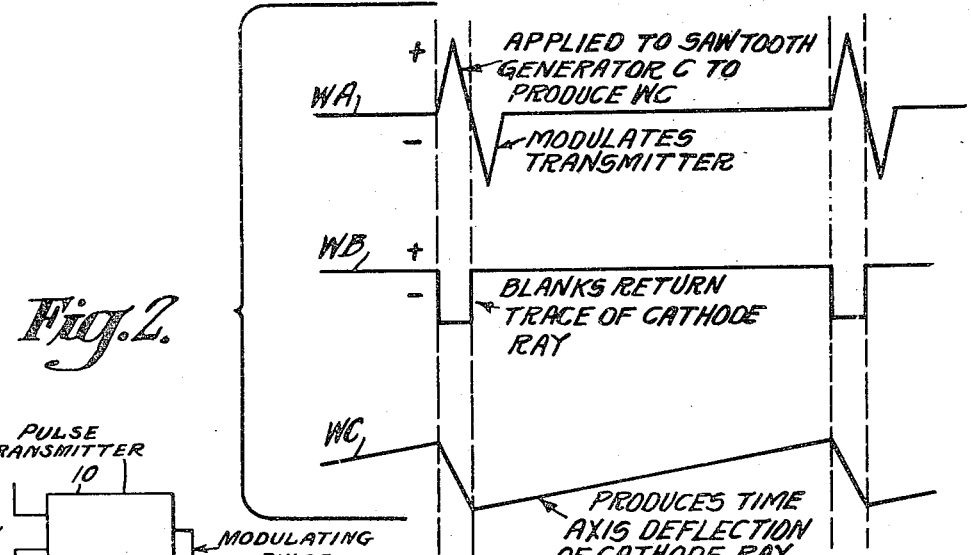
Figure 5:
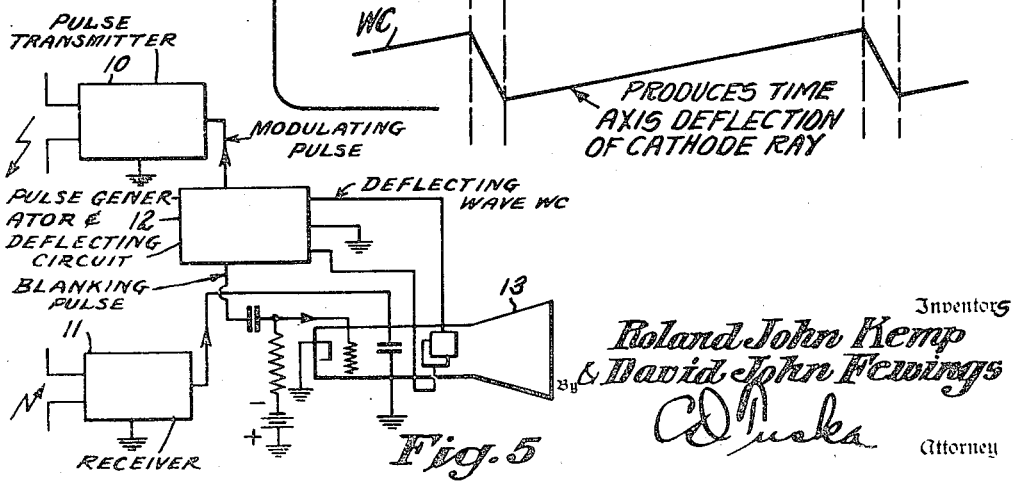

The invention will be better understood from the following description taken in connection with the accompanying drawing in which Figure 1 is a circuit diagram of one embodiment of the invention, Figure 2 is a group of graphs that are referred to in explaining the operation of the circuit shown in Fig. 1, Figure 3 is a circuit diagram of another embodiment of the invention, Figure 4 is a group of graphs that are referred to in explaining the operation of the circuit shown in Fig. 3, and Figure 5 is a block diagram of an embodiment of the invention.

In one embodiment of the invention, illustrated in Figure 1 of the accompanying drawings, an impulse generator and a saw-tooth wave generator comprise respectively a multivibrator and a relaxation oscillation generator, the latter being controlled by impulses from the former. The multivibrator comprises two valves, A and B, which may be triodes, the anode of each being capacity-coupled respectively by condensers ac and bc to the grid of the other, and, through resistances ar and br to the positive terminal of a source (not shown) of high tension energy. The grid of each valve is connected through a grid-leak resistance (respectively ag and bg) to the negative terminal of said source and to earth, and the cathode of each valve is connected to said negative terminal. The grid leak ag of valve A, and the condenser bc, coupling the grid valve A to the anode of valve B, are chosen of considerably lower value than grid leak bg of valve B and coupling condenser ac between the anode of valve A and the grid of valve B. With this arrangement the voltage wave at the anode of valve A comprises, as shown at WA (see also Figure 2) a positive excursion of short duration immediately followed by a negative excursion of the same duration and a return to zero axis for a long period.

The voltage wave at the anode of valve B appears as a negative pulse (WB) at the same instant as the positive pulse at the anode of valve A and therefore can be economically used to extinguish the cathode ray during fly-back of the time base by applying it over lead LB to the cylinder of the cathode ray tube (not shown). The saw-tooth wave generator C is of well known type and includes a valve having its anode connected to the source of high-tension positive potential through a load resistance lr and through a condenser cc to the negative terminal of said source, a screen grid also connected to said source of positive potential through a resistance sr and connected to the negative terminal of said source and to earth through a condenser sc, a control grid connected to the negative terminal through an input resistance ir, and a cathode connected to the negative terminal through a condenser-shunted bias-resistance. The anode of valve A of the multivibrator is capacity-coupled through condenser CA to the grid of the saw-tooth wave generator C and also, separately, through condenser CM over lead LM, to the modulation circuits of the transmitter, and the anode of valve B of the multivibrator is capacity-coupled through condenser CL, over the lead LB already mentioned to the control electrode of the cathode ray tube. The output circuit of the saw-tooth wave generator is coupled to amplifier valves of known kind and the output of these valves is applied over leads X, X', to the horizontal deflection plates of the cathode ray (not shown).

The wave forms are illustrated in Figure 2 wherein WA represents the voltage wave at the anode of valve A and WC represents the voltage wave at the anode of valve C. (In all the Figures 2 to 4 the broken lines indicate an instant of time.)

Where the distance from the receiver to the distant reflecting object is so short as to necessitate high frequency sweeps of the cathode-ray along the time-base line, frequencies of up to say 50 kilocycles/second being involved, there may be so much phase delay in the system that the transmitted impulse and the flyback of the ray are not sufficiently separated or spaced as to obviate confusion. This difficulty is overcome, in a modified embodiment, illustrated in Figure 3 of the accompanying drawings, of the invention by providing a second multivibrator also comprising two triode valves D and E, these valves being coupled together in the same manner as valves A and B. The grid-leak resistance dg of valve D and the condenser ec, coupling the grid of valve D to the anode of valve E, are chosen considerably lower than the grid leak eg of valve E and the condenser dc coupling the grid of valve E to the anode of valve D.

Thus, as illustrated at WD in Figure 3 and Figure 4 of the accompanying drawings, the voltage wave at the anode of valve D comprises a positive excursion of short duration immediately followed by a negative excursion of the same duration and a return to the zero axis. The voltage wave WA, at the anode of valve A is as before. The anode of valve A, is coupled to the grid of the saw-tooth wave generator (not shown) as before but, instead of being coupled, in addition, to the modulation circuit of the transmitter, it is capacity coupled through a condenser CD, lead LD and resistance RD (which may be variable) to the grid of valve D of the second multivibrator and the anode of valve D is capacity-coupled through condenser CM over lead LM to the modulation circuits (not shown). The deflection potential (wave WC, Figure 4) is fed from the amplifier (not shown) as in Figure 1.

With this arrangement the positive peak of the impulse WA at the anode of valve A serves to discharge the time-base circuit of the saw-tooth wave generator (not shown in Figure 3), the simultaneously appearing negative impulse WB at the anode of valve B being transmitted over lead LB and serving to extinguish the cathode ray during the fly-back period of the cathode ray, and the negative peak of the impulse WA appearing at the anode of valve A serves to trip the second multivibrator. The negative peak of the impulse WD appearing at the anode of valve D serves to modulate the transmitter, this modulation being effected at the beginning of the time base excursion of the cathode ray, this negative peak being later in time than the negative peak of the impulse WA and being sufficiently delayed for the cathode ray to complete its return stroke.

The variable resistance RD serves to limit peak volts on the control grid of valve D and by amplitude selection to choose the moment of striking. This is possible because the pulses are more nearly triangular in shape than rectangular and thus some additional control of pulse delay is afforded.

Fig. 5 shows by block diagram how the apparatus of Fig. 1 or Fig. 3 is applied to a range finding system. The pulse transmitter and pulse receiver are indicated at 10 and 11, respectively. Apparatus such as shown in Fig. 1 is indicated by the block 12 while the cathode ray indicator tube is shown at 13.

We claim as our invention:

1. In a range finder comprising a radio-transmitter and a radio-receiver, the receiver including an indicator having time-base deflecting means, an impulse generator including means for generating an impulse having a first component followed by a second component of opposite sense to said first component, a saw-tooth wave generator connected to supply a deflecting wave to said time-base deflecting means, means for applying said first component to said saw-tooth wave generator whereby to control fly-back of the indicating member of said indicator, and means for applying said second component to said transmitter for transmitting a pulse in response to the occurrence of said second component.

2. A range finder as claimed in claim 1, wherein said indicator is a cathode ray tube and said impulse generator is adapted to generate a second impulse in synchronism with said first component, means being provided for applying said second impulse to the cathode ray tube so as to extinguish the cathode ray during the fly-back period.

3. In a range finder comprising a radio-transmitter and a radio-receiver, the receiver including an indicator having time-base deflecting means, an impulse generator including means for generating an impulse having a first component followed by a second component of opposite sense to said first component, a saw-tooth wave generator connected to supply a deflecting wave to said time-base deflecting means, means for applying said first component to said saw-tooth wave generator whereby to control fly-back of the indicating member of said indicator, and means for applying said second component to a second impulse generator to control the generation of impulses thereby, said last mentioned impulses likewise having two components of opposite sense, the first component of said last-mentioned impulse coinciding in time with the second component of said first-mentioned impulse, means being provided for applying the second component of the last-mentioned impulse to the transmitter for transmitting a pulse in response to the occurrence of the second component of the last-mentioned impulse.

4. In a pulse-echo system comprising a pulse transmitter and a pulse receiver, a cathode ray tube indicator in said receiver, means for producing an impulse having a first component followed by a second component of opposite sense to said first component, means for initiating a time axis deflection of the cathode ray of said tube in response to the occurrence of and directly by said first component with said first component occurring during the fly-back time of said deflection, said deflection being linear with respect to its direction of travel, and means for keying said transmitter to transmit a pulse in response to the occurrence of and directly by said second component with said second component occurring during the beginning of said deflection.

5. The invention according to claim 4 wherein said impulse producing means comprises a dissymmetrical multivibrator.

6. The method of operating a pulse-echo system in which there is a pulse transmitter and a cathode ray tube indicator, said method comprising producing an impulse having a first component followed by a second component of opposite sense to said first component, initiating a time axis deflection of the cathode ray of said tube in response to the occurrence of and directly by said first component with said first component occurring during the fly-back time of said deflection, said deflection being linear with respect to its direction of travel, and transmitting a pulse directly in response to the occurrence of said second component with said second component occurring during the beginning of said deflection.

7. The method of operating a pulse-echo system in which there is a pulse transmitter and a cathode ray tube indicator, said method comprising producing an impulse having a first component followed by a second component of opposite sense to said first component, initiating a time axis deflection of the cathode ray of said tube in response to the occurrence of and directly by said first component with said first component occurring during the fly-back time of said deflection, said deflection being linear with respect to its direction of travel, producing directly in response to the occurrence of said second component a second impulse having a first component followed by a second component of opposite sense to the preceding first component, and transmitting a pulse directly in response to the occurrence of the second component of said second impulse with said second component occurring during the beginning of said deflection.

ROLAND JOHN KEMP.
DAVID JOHN FEWINGS.

REFERENCES CITED

The following references are of record in the file of this patent:

UNITED STATES PATENTS

| Number | Name | Date |
|---|---|---|
| 2,202,612 | Urtel | May 28, 1940 |
| 2,405,238 | Seeley | Aug. 6, 1946 |

FOREIGN PATENTS

| Number | Country | Date |
|---|---|---|
| 520,778 | Great Britain | May 3, 1940 |